Oct. 24, 1961 D. T. SHARPE 3,005,864
SEA-WATER BATTERY
Filed March 29, 1945 3 Sheets-Sheet 1

INVENTOR
D. T. SHARPE
BY Edwin B. Cave
ATTORNEY

Oct. 24, 1961 D. T. SHARPE 3,005,864
SEA-WATER BATTERY
Filed March 29, 1945 3 Sheets-Sheet 2

SILVER CHLORIDE ON SILVER SCREEN

INVENTOR
D. T. SHARPE
BY Edwin B. Cave
ATTORNEY

Oct. 24, 1961  D. T. SHARPE  3,005,864
SEA—WATER BATTERY
Filed March 29, 1945  3 Sheets-Sheet 3
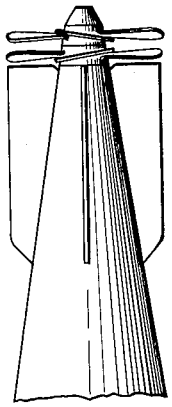
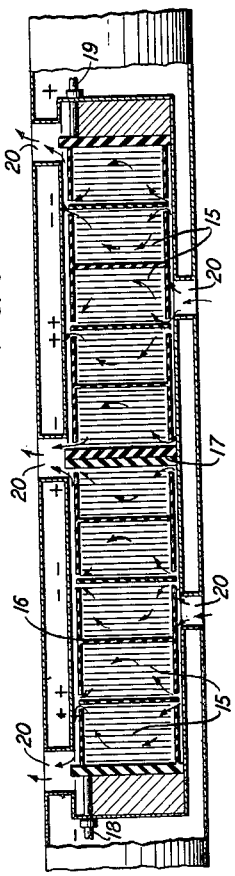
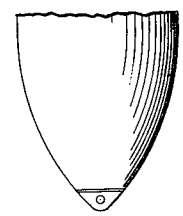
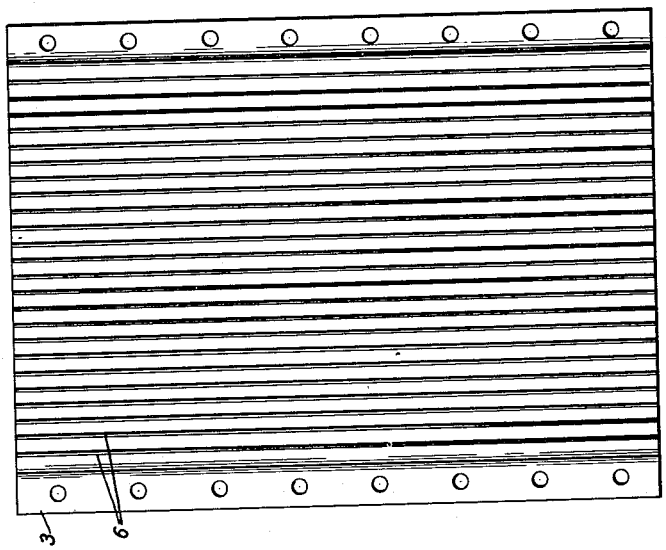
INVENTOR
D. T. SHARPE
BY Edwin B. Cave
ATTORNEY United States Patent Office 3,005,864
Patented Oct. 24, 1961

3,005,864
SEA WATER BATTERY
Duncan T. Sharpe, Morristown, N.J., assignor to Bell Telephone Laboratories, Incorporated, New York, N.Y., a corporation of New York
Filed Mar. 29, 1945, Ser. No. 585,415
9 Claims. (Cl. 136—100)

This invention relates to structures adapted to function as electric batteries when immersed in an electrolyte. More particularly, it relates to structures adapted to function as electric batteries when immersed in sea water.

The description below of the invention may be better understood by reference to the accompanying drawings in which:

FIG. 5 is a plan view of one of the anode sheets of the battery; and

FIG. 6 is a side elevation, partly in section, diagrammatically illustrating the manner in which a battery of the present invention may be mounted in a naval torpedo.

Figure 1:
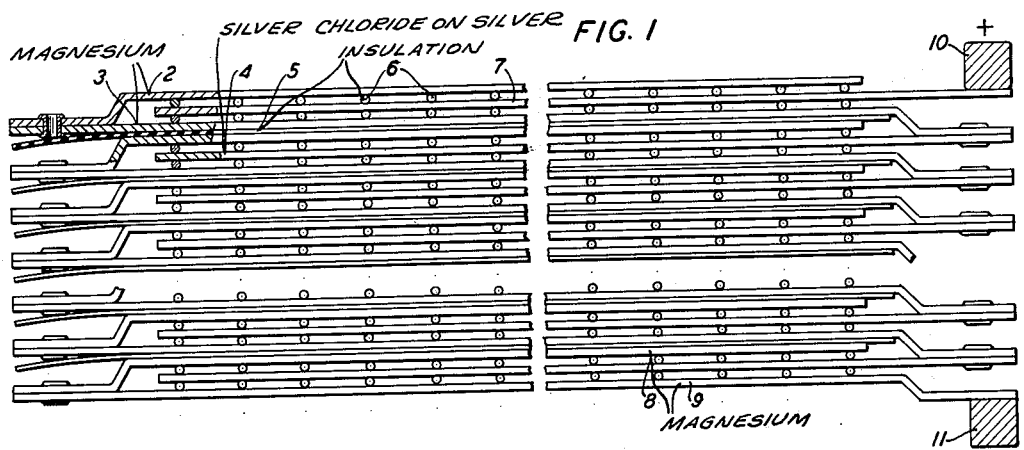
FIG. 1 is a plan view, partly in section, horizontally and vertically broken, of the battery of the present invention.
Figure 2:
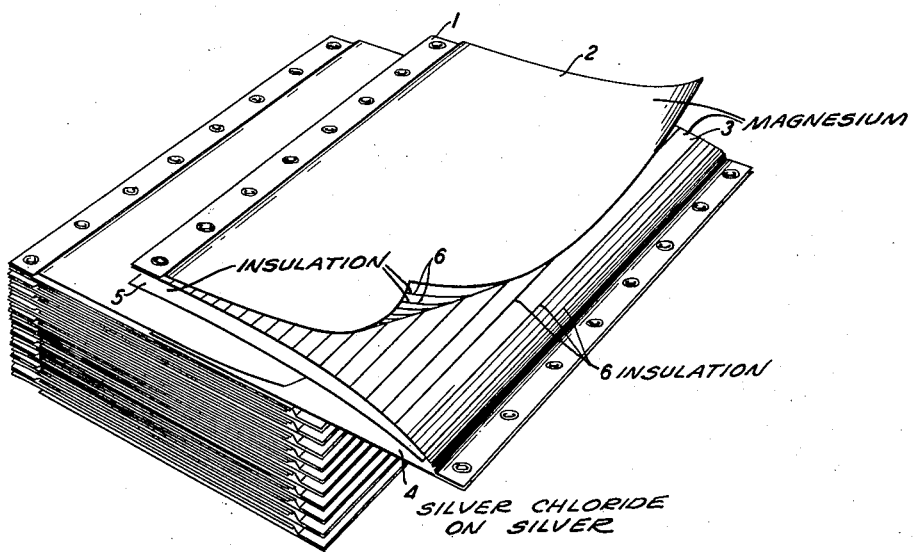
FIG. 2 is a perspective view of a portion of the battery of the present invention showing the manner of assembly.

The structure of the assembled battery is shown in FIG. 1. The battery is made up essentially of a plurality of elements 1 of cross-sectional Z shape as shown in FIG. 2. These elements 1 are made up of two sheets 2, 3 of an anode metal, such as magnesium or a magnesium alloy, joined in any suitable manner along one edge, as by riveting. To the opposite edge of one of the anode sheets is joined, as by riveting, the edge of a cathode sheet 4, thus giving the elements 1 a cross-sectional Z shape. When these elements are assembled to form the battery, sheets of insulating material 5 are interdispersed to insulate the anode sheets of succeeding cells from one another.

The battery structure is assembled by slipping the cathode sheet 4 of each element 1 between the two anode sheets 2, 3 of the next preceding element 1 as illustrated in FIG. 2, to form the pile shown in FIG. 1. Each pair of anode sheets 2, 3 with each cathode sheet 4 between them, functions as a single electric cell when an electrolyte is admitted into the space which separates them. In order to space and insulate the cathode sheet of each cell from its anodes, a plurality of spacer elements 6 are provided.

Figure 3:
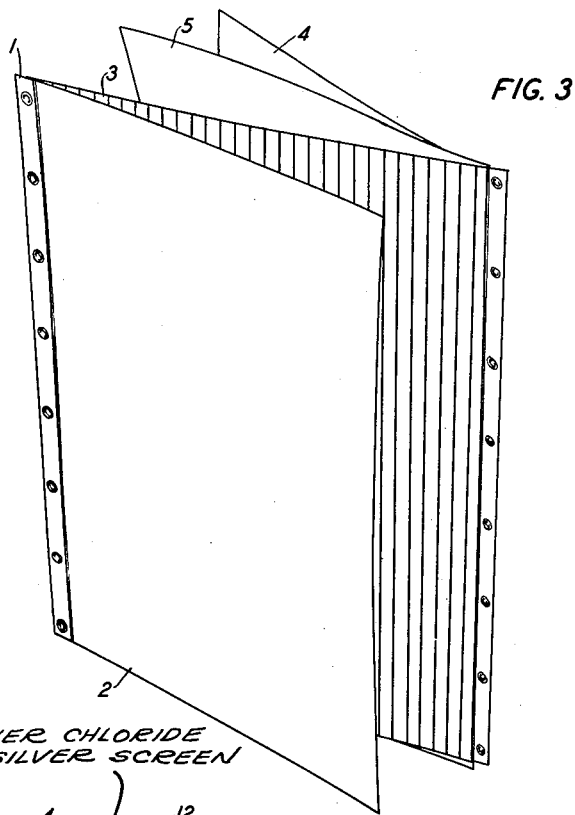
FIG. 3 is a perspective view of one of the elements which make up the battery.

The spacer elements 6 comprise spaced filaments of an insulating material having a diameter equal to the desired spacing between electrodes in the cell. Preferably, these filaments are formed of nylon, although obviously any sufficiently rigid, durable, inert insulating material is suitable. Nylon is the common or generic name of the linear high molecular weight microcrystalline polyamides. These spacer filaments are securely fastened at regular intervals to the inner faces of the anode sheets as shown in FIGS. 2, 3 and 5. These filaments are preferably disposed so that they are parallel to the edges of the anode sheets which are fastened together so that the electrolyte may circulate freely. The filaments may be secured to the anode sheets by any suitable adhesive, preferably the commercially available nylon cement.

The spacers may be advantageously applied to the anode sheets 2 and 3, before the two sheets are joined, by stringing the filaments in their proper arrangement upon an open frame larger than the sheets, applying an adhesive to the filaments, bringing the face of the sheet firmly against the filaments and maintaining the sheet in this position until the adhesive has dried. The filaments may then be cut off even with the edge of the sheet by any suitable means such as a hot wire.

The pile shown in FIG. 1 resulting from the interleaving of the elements 1 is made up of a series of cells, each of which consists of one cathode sheet with an anode sheet on each side spaced therefrom by spacer filaments. The cathode sheet of each cell is electrically connected to the anode sheets of the succeeding cell so as to provide a series arrangement. The adjacent anode sheets of succeeding cells are insulated from one another by the interleaved sheets 5 of insulating material. For this purpose any suitable insulating material which is substantially impervious to the electrolyte may be employed. Preferably, this insulating sheet is made of closely woven nylon fabric impregnated with a heat hardened phenolic resin such as phenol formaldehyde.

To complete the terminal cells of the battery, it is necessary to use elements containing a lesser number of sheets than the elements 1. To form the positive terminal, a cathode sheet 7, identical with cathode sheets 4, is inserted between the two anode sheets of the last element 1 on the positive end of the battery. To form the negative terminal, an element made up of two anode sheets 8, 9, identical, respectively, to anode sheets 2, 3, joined together along one edge surrounds the cathode sheet 4 of the last element 1 on the negative end of the battery.

To lead off the generated current, suitable conductors 10, 11 are fastened in any suitable manner to the cathode sheet 7 and the anode sheet 9, respectively.

To complete the assembly of the battery structure, mechanical pressure is applied lengthwise of the battery in order to secure the anode and cathode sheets firmly in place. The battery is then mounted in any suitable support or container.

The pile described above may be preserved indefinitely in a dry state. When it is to be used, it is immersed in a suitable electrolyte. The electrolyte circulating through the spaces formed by the filament spacers 6 causes the cells to function.

Because of the close spacing of electrodes made possible by the construction described above, it is possible to achieve a high current density within the cell without excessive drop of terminal voltage when a dilute electrolyte is employed. Therefore the structure described is well suited for use where sea water is the electrolyte.

A desirable cell using a sea water electrolyte employs an anode of magnesium or a predominantly magnesium alloy and a cathode made up of silver chloride associated with a current collecting framework.

Therefore for a battery intended to operate with sea water, the anode sheets 2, 3, 8, 9 are formed of either commercially pure magnesium or any of the common predominantly magnesium alloys. Preferably, a magnesium alloy containing a small proportion of aluminum is used since the presence of the aluminum appears to prevent the precipitation, on the anodes, of insoluble magnesium salts which are formed during the operation of the cell. A very suitable commercially available alloy for this purpose is made up of about 6½ percent of aluminum, about 1 percent zinc, about .2 percent manganese and the remainder magnesium.

For the conservation of weight and volume, the anode sheets are preferably as thin as is practicable on the basis of electrochemical requirements, strength and commercial availability. Anode sheets 16 mils in thickness have been found very satisfactory although obviously thicker or somewhat thinner sheets may be found suitable.

In order that the full cell voltage may be reached as quickly as possible after immersion in the electrolyte and application of the load, it is necessary that all surface contamination which would retard the interaction of the electrolyte and anode be removed prior to the assembly of the battery. This may be done conveniently by a simple abrading of the surface of the magnesium, as with a stiff steel wire brush.

If a wet cleaning operation is employed, particularly one involving acid etching, an oxide film is formed which retards rapid generation of the cell voltage. This film can be removed by abrading as above or by subjecting the magnesium to a chromating treatment such as is commonly employed for protecting magnesium from atmospheric corrosion.

The most suitable chromating treatment has been found to consist of immersion of the magnesium for one-half hour at room temperature in an aqueous solution containing 8 ounces of $MgSO_4 \cdot 7H_2O$ and 5.3 ounces of $Na_2Cr_2O_7 \cdot 2H_2O$ per gallon of solution, adjusted to a pH of 3.0 by means of sulfuric acid. This treatment forms a bronze-colored protective film on the surface of the magnesium which tends to protect it from atmospheric corrosion but does not retard the rapid generation of cell voltage. Whenever the battery is to be stored under conditions where the magnesium anodes would be subject to atmospheric corrosion, the battery should be stored in a sealed container preferably containing a suitable desiccant.

The active constituent of the cathode sheets 4 is preferably silver chloride when a sea water electrolyte is used. Silver chloride is a substantially non-conductive material. Therefore electrodes embodying this material must have a current collecting framework of conductive material. Although it is commonly supposed that the reduction of silver chloride to silver takes place directly in the operation of silver chloride cells, it can be demonstrated that the reduction of the electrode takes place through the continuous dissolution of the silver chloride in the electrolyte immediately adjacent to the conductive base and the simultaneous deposition of the silver ions as metallic silver upon the conductive base, the chloride ions remaining in solution. Therefore the reduction of a silver chloride electrode must be treated as a plating process. Since the current and also voltage generating ability of the electrode in a cell is dependent upon the rate at which the metallic silver is plated, it is essential that large areas of the conductive framework be exposed to the electrolyte and that large areas of silver chloride exist in contact with the electrolyte in close proximity to the conductive framework if a virtually instantaneous peak cell voltage and high current output are required.

A suitable cathode sheet 4 which is satisfactory both from an electrochemical standpoint and from the standpoint of mechanical strength may be produced by forming a layer of silver chloride upon a relatively fine screen of silver wire by immersing the screen as an anode in an aqueous solution containing chloride ions. The quantity of silver chloride formed and therefore the capacity of the electrode is determined by the number of ampere minutes of formation. After the desired number of ampere minutes have passed through the silver base the anodizing current is discontinued.

Figure 4:
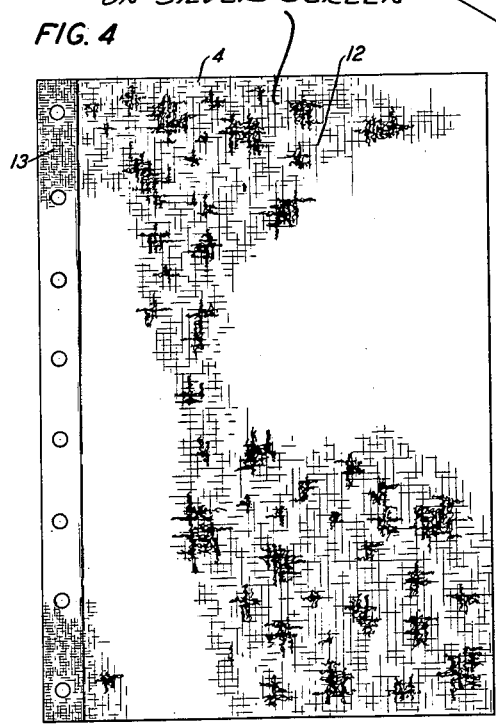
FIG. 4 is a plan view of one of the cathode sheets of the battery.

In order to provide a suitable electrical connection to the other electrodes of the battery one edge of the screen is preferably left unanodized. This may be accomplished by coating the portion to remain unanodized with a lacquer prior to the anodizing operation. The lacquer may be removed mechanically subsequently. The resulting electrode 4 as shown in FIG. 4 has its major portion 12 coated with silver chloride, whereas the left edge 13 remains as bare mesh. This bare edge may be fastened to the anode sheet 3 by grommets as shown in FIG. 3.

Any suitable aqueous electrolyte containing chloride ions may be employed in the anodizing operation. An aqueous solution of sodium chloride or hydrochloric acid in which the chloride ions constitute in the vicinity of 2 percent by weight of the solution has been found satisfactory.

In order to increase the rate at which the formation of silver chloride takes place, it has been found desirable to heat the electrolyte to e.g. 75° C. This also considerably improves the physical properties of the deposit.

Another expedient which may be employed to decrease still further the time required for anodizing is to add to the electrolyte a low concentration of anions which will form with silver a compound more soluble than silver chloride. Fluoride ions or preferably nitrate ions may be employed for this purpose. Nitrate ions may be added in the form of nitric acid (conc.) at the rate of 5 cc. per square foot of screen.

The anodizing potential and current density are not critical and the most desirable values can readily be determined by those skilled in the art. A potential of about 18 volts has been found satisfactory for all purposes. The anodizing is continued until slightly more than the desired number of ampere minutes to be generated by the cell have passed through the screen.

After being anodized the mesh is suspended for a short period as a cathode in any suitable electrolyte which will not have a harmful effect on the silver chloride coating. This cathodizing operation may be carried out simply by reversing the polarity of the electrodes in the anodizing bath. Preferably, however, the screen is removed from the anodizing bath and suspended as a cathode in an aqueous solution of sodium chloride containing roughly 5 percent of sodium chloride for the required period of time. This cathodizing operation usually is carried out at or above the current density at which the cathode is intended to be discharged in the cell in which it is to be employed. This operation is made very brief, e.g. 4 to 6 seconds, so that only a minimum of the capacity of the electrode is destroyed by reduction of the silver chloride to metallic silver.

During this cathodizing operation, filamentary bridges of porous metallic silver connecting the wires of the mesh with the outer surfaces of the silver chloride layer are formed by the reduction of the walls of pores in the silver chloride coating.

The screen is then immersed in a suitable reducing agent adapted to reduce chemically the entire outer surface of the silver chloride to form a thin conductive layer of porous silver. This reduced surface connected by the metallic silver bridges to the inner silver wires of the mesh constitutes a very effective current collecting framework which will enable the immediate generation of extremely high current densities in cells employing this electrode. Since current generation by reduction of silver chloride takes place only at points where the electrolyte meets the current collecting metal framework adjacent to a body of silver chloride, rapid current generation requires a large current collecting surface accessible to the electrolyte and intimately associated with the silver chloride which is to be reduced.

One of the most effective reducing agents for the formation of this conductive layer on the silver chloride is an aqueous solution of hydroxylamine. Other suitable reducing agents are aqueous solutions of any of the common photographic developers, such as p-aminophenol, o-aminophenol, amidol (2,4-diaminophenol hydrochloride), metol (p-methylaminophenol sulfate), catechol or hydroquinone. The concentrations which are common for photographic developing are suitable and the pH of the solutions should be adjusted as in photographic developing solutions. Immersion for about one minute is ordinarily satisfactory.

A particularly effective reducing solution of the photographic developer type contains, in each liter of aqueous solution, approximately 1.5 grams of hydroquinone, 0.5 gram of elon (p-methylaminophenol sulfate), 6 grams of anhydrous sodium sulfite, and 9 grams of anhydrous sodium carbonate.

In order to consolidate and impart mechanical strength to the silver surfaced silver chloride coating, the mesh is subjected to a high mechanical pressure such as 3 to 4 tons per square inch to form a compact electrode, e.g. two-thirds its former thickness. The finished electrode has the appearance of a solid silver sheet flecked with silver snowflakes caused by the arrangement of the silver bridges as illustrated in FIG. 4. The pressing operation may be performed at any time after the anodizing operation. Thus the electrode may be subjected to mechanical pressure immediately after anodizing and before the subsequent reducing operations, or it can be pressed after cathodic reduction and before the chemical surface reduction or it can be pressed after all three operations have been completed.

The above described method of producing cathodes and the electrodes so produced are more particularly described in the copending applications of H. E. Haring, Serial Nos. 585,417, now abandoned and 585,418, filed on the same day as the present application.

The high power and energy output of the battery disclosed above, per unit weight and volume, and its ability to operate with a sea water electrolyte render it well suited for the propulsion of naval torpedoes. To illustrate the compactness of cells of the type described above, these cells may, in one embodiment, be formed of magnesium anode sheets of a thickness of 16 mils, cathode sheets of a thickness of 22 mils and filament spacers 20 mils in diameter. The impregnated nylon spacer sheets may conveniently have a thickness of 5 mils. Thus, a practical cell can be constructed having a thickness not greater than one-tenth of an inch. These cells may conveniently be operated at a current density of one ampere per square inch of electrode surface. Thus, with a working area of eight inches by ten inches on the cathode sheet and using both sides of the cathode, 160 amperes may be generated. The open circuit voltage of each cell having a magnesium anode, a silver chloride cathode and a sea water electrolyte is about 1.6 volts. At a current density of one ampere per square inch the voltage of a cell such as described will be about 1.1 volts.

A battery of one hundred of such series connected cells, having an area of eight inches by ten inches as set forth above, will have a thickness of ten inches or an overall size of eight inches by ten inches by ten inches and when operated at a current density of one ampere per square inch will deliver 160 amperes at about 110 volts, thus yielding a power output of about 17.6 kilowatts. This corresponds to an output of about 38 kilowatts per cubic foot of battery.

FIG. 6 illustrates a convenient arrangement whereby batteries of the present invention may be mounted in a naval torpedo. Each of the units 15 is a diagrammatic representation of a battery pile as illustrated in FIG. 1. The plates of the battery are mounted perpendicular to the longitudinal axis of the torpedo with the filament spacers disposed vertically to permit the free vertical flow of electrolyte between the electrodes. Ten separate battery units 15 are shown in FIG. 6 and are connected in a series parallel arrangement to give the desired voltage and current.

Each battery unit 15 is completely enclosed in a compartment formed by the walls 16 of insulating material, with the exception of two ports, one in the bottom of each compartment for the admission of sea water and one in the top for the discharge of sea water. The battery units are divided into two groups by the central and heavier insulating partition 17. All of the units 15 forward of the partition 17 are connected in parallel (by means not shown) as are the units to the rear of the partition. These two groups of parallel connected batteries are connected in series (by means not shown). The terminal conductors 18 and 19 carry the generated power to the driving motor of the torpedo.

In each bank of parallel-connected batteries, unit 15 is so disposed that its terminal adjacent to one of the ports in the walls 16 has the same polarity as the adjacent terminal of the next succeeding unit. In this manner the power loss due to current leakage between units through the electrolyte is minimized. In each individual unit 15, all of the cells are of necessity immersed in a single electrolyte and no attempt is made to restrict leakage between cells through the electrolyte other than by maintaining the free space above the cells at a minimum consistent with adequate electrolyte flow.

The power loss from this leakage is essentially constant for any particular battery voltage and for any particular size and shape of the container in which the battery is placed. The ratio of power lost in this manner to useful power output therefore decreases as the power output of the battery increases. At the high rates of discharge at which the battery is designed to operate, the power loss from this source is proportionately small and can readily be maintained at substantially less than 10 percent. It is obvious that the useful power must be taken off from the battery soon after it is immersed in the electrolyte or it will expend itself through leakage.

Ports 20 are provided in the shell of the torpedo for the admission of sea water to the space surrounding the walls 16 and for its discharge. Continuous circulation of the sea water upward through the cells is maintained by the generation of hydrogen as the product of a side reaction between the freshly exposed magnesium surfaces of the anode and the water of the electrolyte. This gas as it is generated carries the electrolyte upward and out of the cells allowing fresh electrolyte to enter. Adequate circulation of electrolyte not only cools the cells but also prevents the deposit of insoluble magnesium salts within the cell. Forced circulation may often be found desirable. This forced circulation may be maintained either by pumping the electrolyte through cells or by utilizing scoops on the torpedo for forcing the electrolyte through the cells.

Although the invention has been described in terms of its specific embodiments, certain modifications and equivalents will be apparent to those skilled in the art and are intended to be included within the scope of the present invention, which is to be limited only by the reasonable scope of the appended claims.

What is claimed is:

1. A battery electrode assembly adapted to function as an electric battery, when immersed in an electrolyte, comprising a plurality of elements each made up of three substantially flexible sheets of substantially the same shape, each having two substantially parallel straight edges, two of the sheets being formed of a material adapted to function as one electrode of a cell and being fastened together along one of said edges, the third sheet being formed of an electro chemically dissimilar material adapted to form the opposite electrode of a cell and being fastened along one of its edges to the edge of one of said first-mentioned sheets which is opposite to the edge at which it is fastened to the other of said first-mentioned sheets, said elements being assembled so that the sheet of each element which is unlike the other two sheets is sandwiched between but spaced from the two like sheets of the next succeeding element.

2. A battery electrode assembly adapted to function as an electric battery, when immersed in an electrolyte, comprising a plurality of adjacent cells each made up of a cathode sheet sandwiched between two anode sheets formed of a metal electro-chemically dissimilar from said cathode sheet, said cathode sheet being spaced from said anode sheets by a spacing means which will allow electrolyte to circulate in the space between said sheets, the adjacent anode sheets of succeeding cells being arranged back to back but being separated by an insulating barrier sheet, said anode and cathode sheets having two substantially parallel substantially straight edges, one of the adjacent edges of the two anode sheets of each cell being fastened together along substantially the entire edge, the opposite edge of one of said anode sheets being joined along substantially the entire edge to the adjacent edge of the cathode sheet sandwiched between the next succeeding pair of anode sheets, the entire structure being readily assembled from the Z-shaped elements composed of said joined anode and cathode sheets.

3. The structure described in claim 2 wherein the anode sheets are made of a metal which is predominantly magnesium and the cathode sheets are made of a silver base carrying a deposit of silver chloride.

4. The structure described in claim 2 wherein the anode sheets are made of a metal which is predominantly magnesium and the cathode sheets are formed of a metal base having a layer of silver chloride on its surface, a thin layer of porous reduced metallic silver on the outer surface of said silver chloride layer and a plurality of filamentary bridges of reduced metallic silver extending between and electrically connected to, the metal base and the outer layer of metallic silver.

5. The structure described in claim 2 wherein the spacing means consists of a plurality of filaments extending substantially the full length of the anode sheets and fastened thereto by a suitable adhesive, said filaments being substantially parallel to each other and substantially parallel to each other and substantially parallel to the edges along which said sheets are fastened.

6. The structure described in claim 2 wherein the anode sheets are made of a metal which is predominantly magnesium, wherein the spacing means are attached to said anodes by a suitable adhesive and consist of a plurality of polyamide filaments which are substantially parallel to each other and substantially parallel to the edges along which said sheets are fastened and wherein the cathode sheets are formed of silver chloride intimately associated with a framework of metallic silver.

7. A battery electrode assembly as described in claim 2 wherein the cathode sheets are formed of a silver screen covered with a layer of silver chloride, which layer has on its surface a porous, thin, conductive layer of reduced metallic silver electrically connected to the silver screen by a plurality of filamentary bridges of reduced metallic silver extending through the silver chloride layer.

8. An electric battery element comprising two anode sheets of magnesium each having two essentially parallel edges, said sheets being positioned in face-to-face relationship and fastened together along only one of said edges, the opposite edge of one of said anode sheets being fastened to one edge of a cathode sheet comprising a silver wire screen which is of substantially the same size and shape as the said anode sheet to which it is fastened and which is positioned in face-to-face relationship with the outer face of said anode sheet to which it is fastened, said silver screen being covered with a layer of silver chloride having on its surface a thin, porous, conductive layer of reduced metallic silver electrically connected to the silver screen by a plurality of filamentary bridges of reduced metallic silver extending through the silver chloride layer.

9. The element described in claim 8 wherein each of the magnesium sheets has a plurality of spaced polyamide filaments fastened by means of an adhesive to that one of its surfaces which faces the other magnesium sheet to which it is fastened, said filaments being substantially parallel to each other and to the edges of said magnesium sheets along which said sheets are fastened, said filaments extending substantially the full length of said sheets.

References Cited in the file of this patent

UNITED STATES PATENTS

| | | |
|---|---|---|
| 405,196 | Barrett | June 11, 1889 |
| 1,332,483 | Bridge | Mar. 2, 1920 |
| 2,176,428 | Kershaw | Oct. 17, 1939 |
| 2,317,711 | Andre | Apr. 27, 1943 |